United States Patent [19]

Hannel

[11] Patent Number: 4,696,197
[45] Date of Patent: Sep. 29, 1987

[54] SYSTEM FOR COUNTERBALANCING TOOL MOUNT LOADS IN A MACHINE TOOL

[75] Inventor: Clifford L. Hannel, Los Angeles, Calif.

[73] Assignee: Lockheed Corporation, Calabasas, Calif.

[21] Appl. No.: 851,041

[22] Filed: Apr. 11, 1986

[51] Int. Cl.[4] .................. F16H 25/24; B23B 39/14; G05G 11/00

[52] U.S. Cl. .................. 74/89.15; 16/1 C; 74/424.8 R; 74/479; 248/654; 384/519; 384/583; 408/3; 408/88; 408/235; 414/719; 901/48

[58] Field of Search ............ 74/89.15, 424.8 R, 479; 91/361; 16/1 C; 248/652, 653, 654; 414/719; 901/48; 384/519, 540, 583; 408/3, 88, 234, 235

[56] References Cited

U.S. PATENT DOCUMENTS

| | | | |
|---|---|---|---|
| 1,778,258 | 10/1930 | Jennings | 384/540 |
| 4,040,685 | 8/1977 | Berglund | 384/540 X |
| 4,041,287 | 8/1977 | Kolell et al. | 235/151.11 |
| 4,229,136 | 10/1980 | Panissidi | 901/48 X |
| 4,233,491 | 11/1980 | Maruyama et al. | 219/125.1 |
| 4,246,812 | 1/1981 | Gladwin et al. | 82/1 C |
| 4,262,402 | 4/1981 | Cooper et al. | 29/157.4 |
| 4,271,471 | 6/1981 | Castner | 364/474 |
| 4,300,198 | 11/1981 | Davini | 901/48 X |
| 4,366,423 | 12/1982 | Inaba et al. | 318/563 |
| 4,466,769 | 8/1984 | Inaba et al. | 74/89.15 X |
| 4,500,251 | 2/1985 | Kiryu et al. | 901/48 X |
| 4,506,335 | 3/1985 | Magnuson | 364/513 |

FOREIGN PATENT DOCUMENTS 1393349 5/1975 United Kingdom .................. 901/48

*Primary Examiner*—Allan D. Herrmann
*Attorney, Agent, or Firm*—Louis L. Dachs

[57] ABSTRACT

The invention is a system to counterbalance the static torque produced by a weight mounted to a beam member which in turn is rotatably mounted to a frame member, the beam member rotatable about the axis of rotation which is substantially aligned with the longitudinal axis of the frame member. The system comprises a support member rotatively mounted to the frame member and coupled to the beam member for simultaneously rotation about the axis of rotation. A pressurizable power actuator having a first end pivotally mounted to the frame member and a second end having an output shaft for producing an output force proportional to the pressure level within the actuator. A coupling device is included connecting the output shaft to the support member. A pressure level control system is provided for maintaining the pressure level within the actuator to produce a torque sufficient to counterbalance the torque produced by the weight.

7 Claims, 9 Drawing Figures

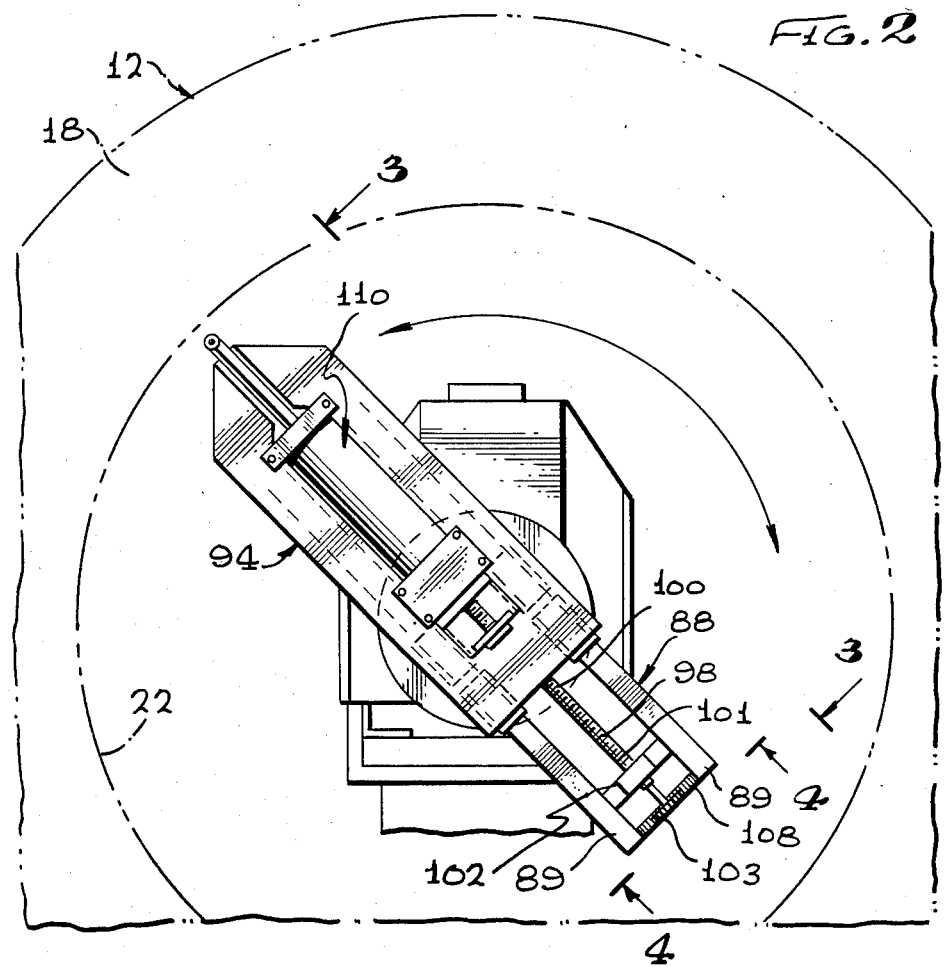
FIG. 2
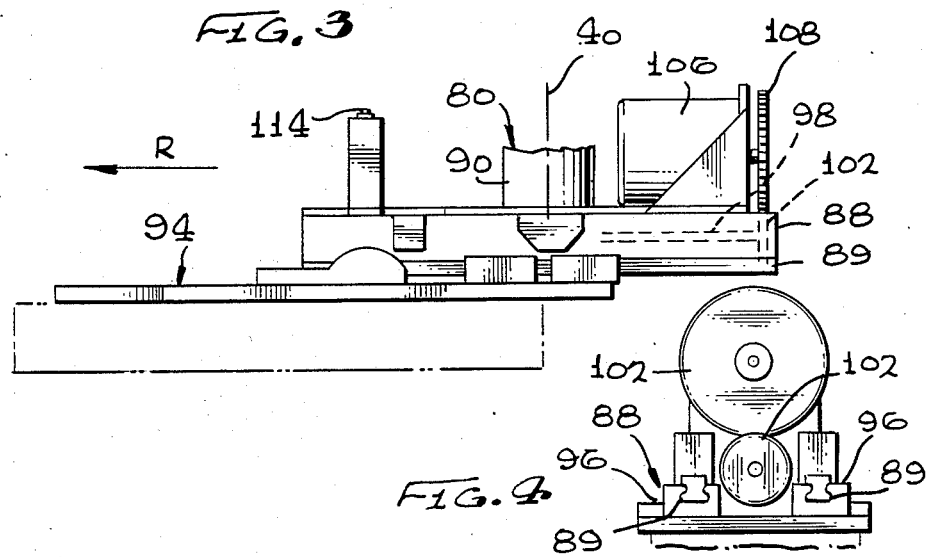
FIG. 3
FIG. 4

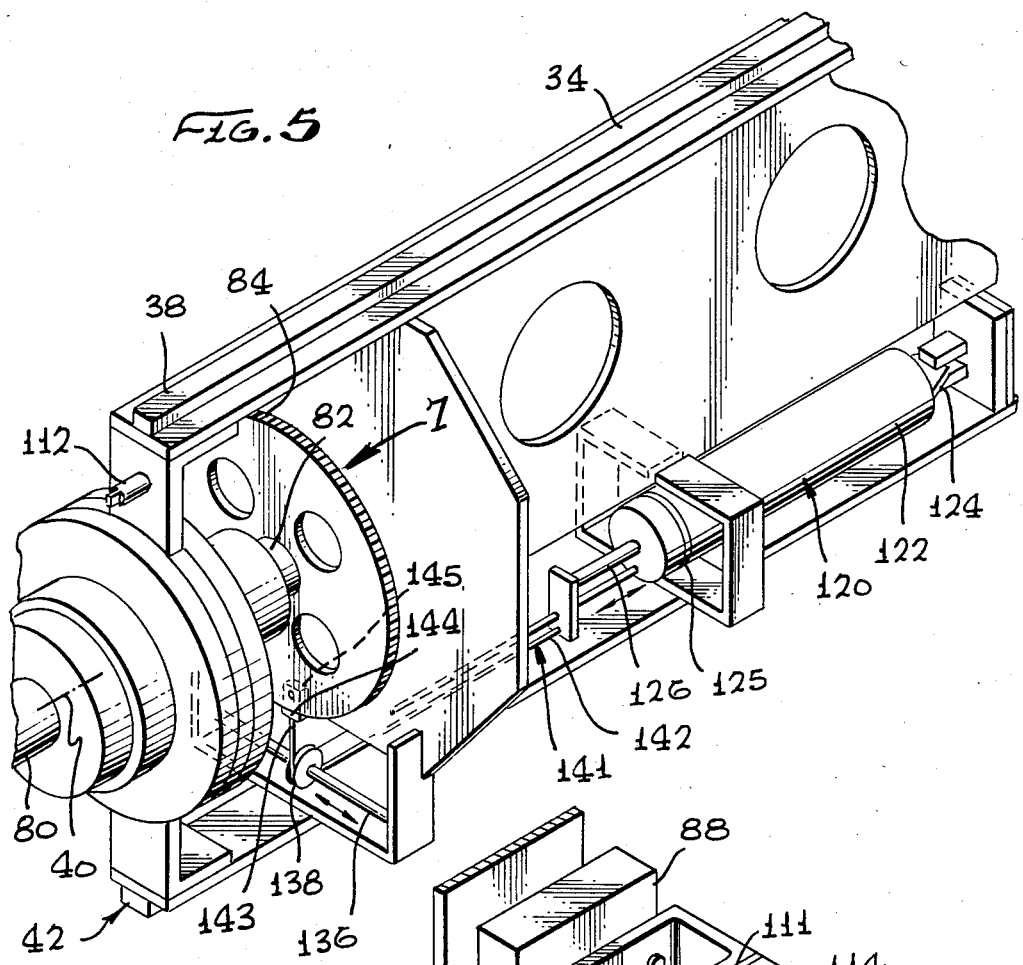
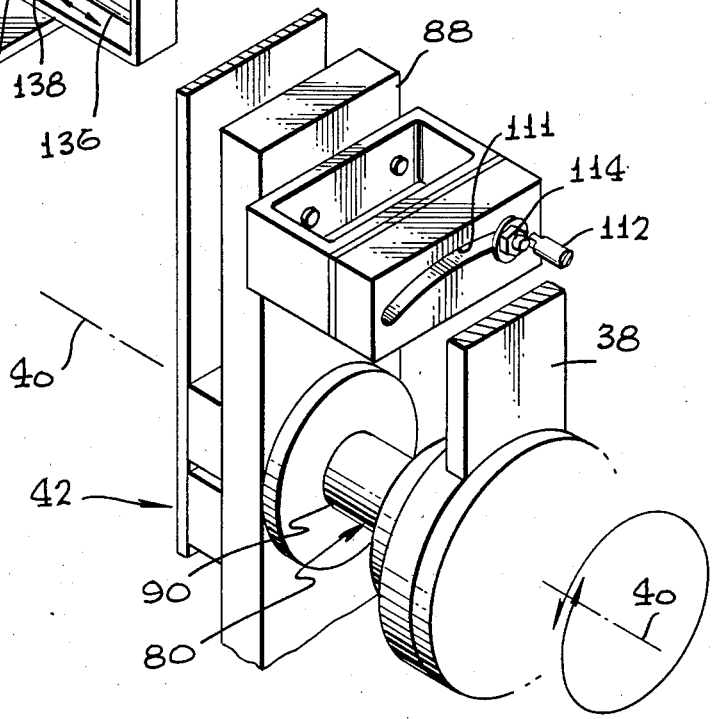

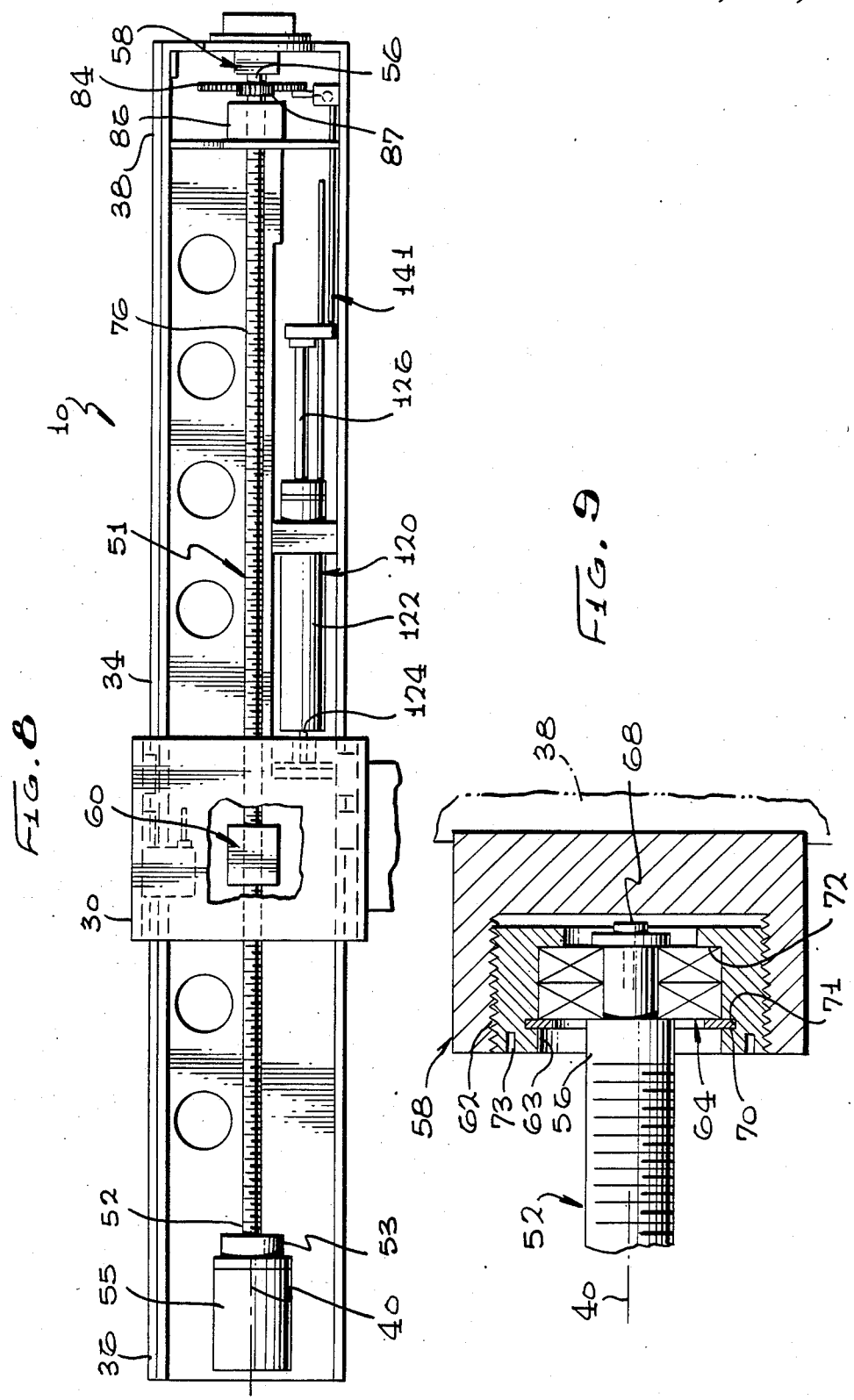

SYSTEM FOR COUNTERBALANCING TOOL MOUNT LOADS IN A MACHINE TOOL

TECHNICAL FIELD

The invention relates to the field of automatic machine tools and, in particular, to a system of counterbalancing loads induced by the tool mount.

BACKGROUND INFORMATION

In the aircraft industry, where production rates are measured in the 10 to 25 aircraft per year range, the introduction of highly automated machines has been somewhat limited. Of course, the traditional computer controlled three and five axis milling machines have been used to machine large forgings, automatic fastener installation machines for wing and fusalage panels, etc. However, the use of robotic machines, such as spot welders found on automobile production lines, have not as yet found many economically viable applications.

With the introduction of the new generation of high power computers and their reduction in cost, it is now possible to use robotic type machines in the manufacture of low production rate articles such as aircraft.

Along with the new computers has been the emergence of composite materials as a viable aircraft structural material. Slowly over the years, composite structures have graduated from secondary structures such as fairings and radomes to vertical stabilizers, ailerons and flaps, etc. Now, composite wings and fuselage sections are a reality. The advantage of composites is that large and complex assemblies can be fabricated in what is almost a two-step process—layup of the uncured composite materials in a mold and the curing at high temperature under pressure. Composite materials produce a higher strength to weight ratio or modulus to weight ratio part at a lower cost.

However, such complex assemblies require considerable post processing. For example, composite fuselage section may require routing out of access holes, the drilling of fastener holes, etc. Furthermore, additional structural components must be installed therein. In the past, this was accomplished using conventional techniques during the final assembly parts. Unfortunately, for most robotic machines designed to accomplish a multitude of different functions, size is not necessarily basic consideration. Thus, with conventional robotic equipment there is often a problem of "reaching" into the interior of such a structure to accomplish even simple machining functions. For example, consider a six foot long fuselage section for a vehicle 30 inches in diameter and having interior bulkheads with only a 14 inch opening therein. The design of a computer controlled machine having a tool mount capable of shrinking down in size to fit through the 14 inch opening and thereafter radially expand and extend well into the interior of the structure to accurately perform such machining operations is not easy to accomplish.

Therefore it is a primary object of the subject invention to provide a multifunction machine too that can be used in confined spaces.

Another object of the subject invention is to provide a multifunction machine tool which has a three axis motion tool mount that could be used in confined spaces.

A still further object of the subject invention is to provide a multifunction machine tool having a rotatable and radially extendable tool mount located on an unsupported end of a horizontally translating beam wherein the static torque about the axis of rotation of the tool mount is counterbalanced.

A still further object of the subject invention is to provide a multifunction machine tool that has means to change the natural frequency of the tool mount positioning structure.

DISCLOSURE OF THE INVENTION

The invention is an improvement to a machine of the type having a stand with a frame member moveably mounted thereto driven fore and aft by a drive screw. The screw is rotatively mounted by its ends to the frame member and passes through a nut attached to the stand. Thus, rotation of the screw by means of an electric motor causes the frame member to translate. Mounted on one end of the frame member is a beam member extending radially outward from, and which is rotatable about an axis of rotation. A support member adapted to mount a variety of tools such as electrically or pneumatically driven drills, routers and fastener installation tools, is slideably mounted to the beam member and is translatable by a second electric motor in a radially inward or outward direction from the axis of rotation of the beam member. The beam member is mounted to a shaft which is coupled to a ring gear. A third drive motor rotates the beam member via the ring gear.

In detail, the improvement is a system to counterbalance the static torque about the axis of rotation of the tool support as it moves both radially and rotationally about the axis of rotation.

A pressurizable power actuator is mounted by a first end to the frame member and at its second end incorporates an output shaft for providing an output force proportional to the pressure level within the actuator. A coupling means connects the output shaft to the support member which comprises a rod having a pulley member slideably mounted thereto. The rod is mounted to the frame member substantially in a horizontal plane and at right angles to the axis of rotation of the beam member. A flexible cable having a first end pivotally attached to the support beam, a second end attached to the output shaft and a portion between the ends extending about the pulley.

Also provided are pressure level control means for maintaining the pressure level within the actuator for producing a torque sufficient to counterbalance the torque produced as the tool support and tool rotate. The pressure control means further includes means to vary the value of the pressure level within the actuator so that the torque of the tool support and tool remains counterbalanced as they traverse inward and outward along the beam member.

Thus, a counterbalancing force is provided to offset the weight of the tool support and tool. Furthermore, compensation is provided to counterbalance the torque changes as the tool support and tool move in and out along the beam member.

Additionally, means are provided to vary the tension load on the frame member drive screw so as to control the natural frequency of the drive screw.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a partial perspective view of a machine tool incorporating the subject system for counterbalancing tool mount loads positioned to conduct manufacturing operations on a part.

Illustrated in FIG. 2 is a partial view of the machine tool shown in FIG. 1 taken along the line 2—2.

Illustrated in FIG. 3 is a view of FIG. 2 taken along the line 3—3.

Illustrated in FIG. 4 is a view of FIG. 2 taken along the line 4—4.

Figure 1:
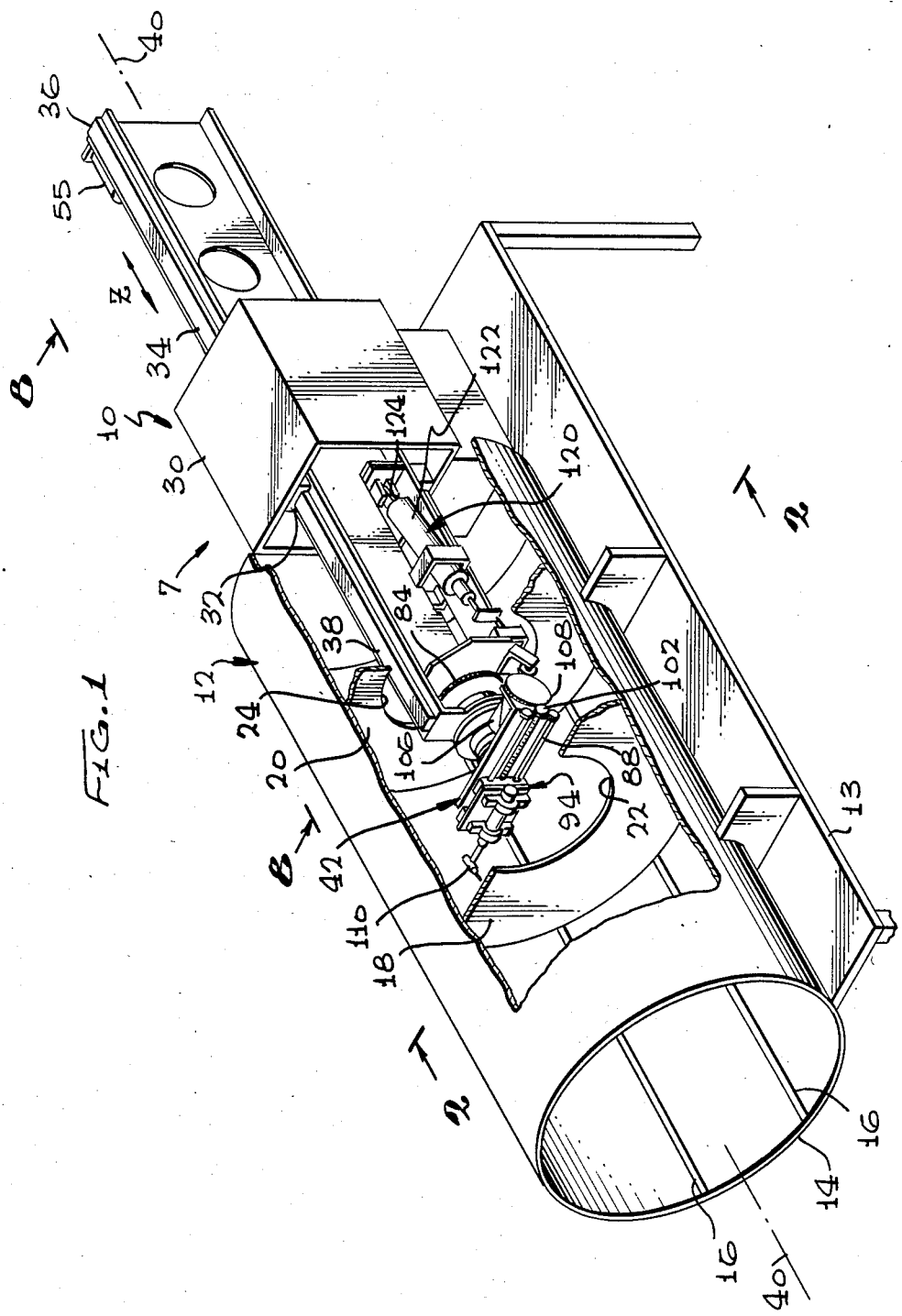

Illustrated in FIG. 5 is an enlarged perspective view of the system for counterbalancing tool mount loads shown in FIG. 1.

Figure 6:
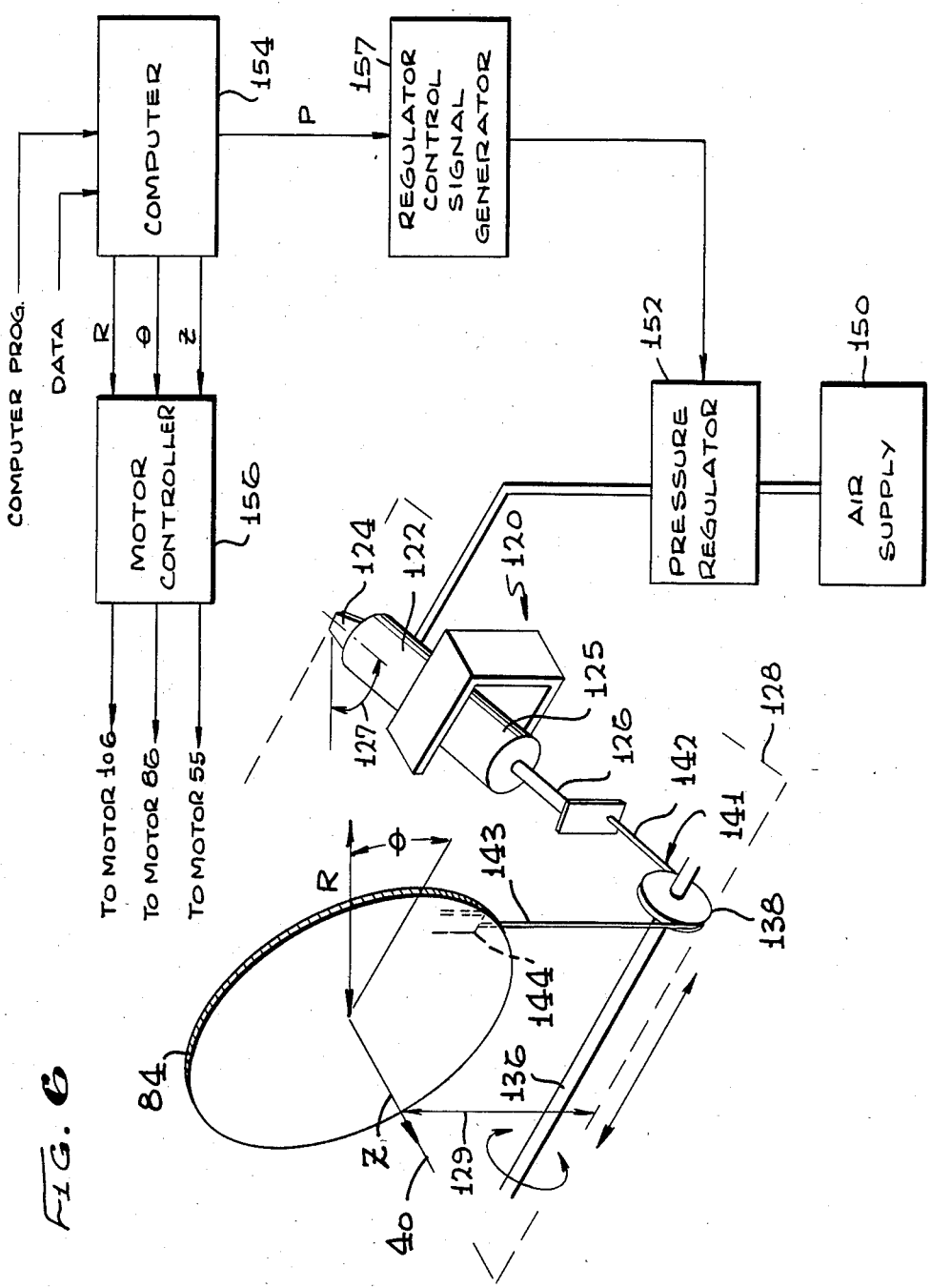

Illustrated in FIG. 6 is a schematic representation of the system to counterbalance tool mount loads shown in FIG. 5.

Illustrated in FIG. 7 is a partial perspective view illustrated in FIG. 1 taken in the direction of arrow 7 shown in FIG. 5.

Illustrated in FIG. 8 is a partial side view of the machine tool shown in FIG. 1 taken along the line 8—8.

Illustrated in FIG. 9 is an enlarged cross-sectional view of a portion of the machine tool shown in FIG. 8.

BEST MODE FOR CARRYING OUT THE INVENTION

Referring to FIG. 1 it can be seen that the machine tool, generally designated by numeral 10, is shown being used in the manufacture of a hollow aircraft fuselage section 12 held in place by a support structure 13. The fuselage section 12 comprises an outer tubular skin 14 having longitudinal reinforcements 16 with internal bulkheads 18 and 20 having apertures 22 and 24, respectively, therethrough. The fuselage section depicted is for purposes of illustration and should not be construed as the only type of part that the machine tool 10 can be used to manufacture.

The machine tool 10 comprises a hollow stand 30 having internal guide tracks 32 for slideably supporting a frame member 34. The frame member 34 has a first end 36 and a second end 38 defining the longitudinal axis 40 thereof. Mounted to the second end 38 of the frame member 34 is a tool positioning means generally designated by numeral 42.

Illustrated in FIG. 8 is essentially a side view of the frame member 34 taken along the line 8—8 in FIG. 1, while, illustrated in FIG. 9 a partial cross-sectional view of a portion of end 38 of the frame member 34. A drive screw 51 is supported at its first end 52 by a fixed bearing 53 mounted to the frame member 34 and which is driven by an electric motor 55, also mounted to the frame member 34. The drive screw 51 is coupled at its second end 56 to a bearing assembly 58 mounted to the second end 38 of the frame member. The drive screw 51 engages an internally threaded nut 60 mounted to the stand 30. Thus rotation of the drive screw 51 moves the frame member 34 along the longitudinal axis 40 (Z axis).

Referring, particularly, to FIG. 9 the bearing mount assembly 58 comprises an internally threaded housing 59 having a nut 62 threadably engaged therein. The nut 62 has an internal bore 63 in which is mounted a bearings assembly 64. The second end 56 of the drive screw 51 is rotatably mounted in bearing assembly 64 and retained thereto by fastener assembly 68. Snap ring 70 mounted in groove 71 in the nut 62 is used to maintain the bearing within the internal bore 63 and in contact with shoulder 72. The nut 62 is provided with spanner holes 73 and, thus, by rotation of the nut 62 the tension load on that portion 76 of the drive screw 51 between the nut 60 mounted to the stand 30 and the bearing assembly 58 can be adjusted. This essentially, allows the natural frequency of the screw 51 to be varied. Having this adjustment capability allows the "tuning out" of any vibration produced by machining operations and traversing.

Referring again to FIG. 1 and initially to FIGS. 2-8 it is seen that the tool positioning means 42 comprises a shaft 80 rotatably mounted in the end 38 of the frame member 34 rotatable about the longitudinal axis 40. Mounted to end 82 of the shaft 80 is a gear 84. Referring, particularly to FIG. 8 it can be seen that a drive motor 86 is mounted to the frame member 34 having an output gear 87 in engagement with gear 84. Thus, motor 86 controls the angular position (angle) of the shaft 80.

A beam member 88 (best seen in FIGS. 2-4) having a pair of guide rails 89 is mounted to the second end 90 of the shaft 80. A tool support member 94 is moveably mounted to the beam member 88 by means of bearing blocks 96 attached thereto which slideably engage rails 89. The beam member 88 incorporates a screw 98 rotatably mounted thereto having a first end 100 threadably engaging a nut (not shown) in the tool support member 94 and a second end 101 rotatably supported by bearing 102 mounted to the beam member 88. A gear 103 is mounted to the end 101 of the screw 98. An electric motor 106 is mounted to the beam member 88 having an output gear 108 engaging gear 103. Thus, rotation of the motor 106 will cause the tool support member 94 to extend or retract radially (R direction) from the longitudinal axis 40. As illustrated, the tool support member 94 mounts an electrically powered drill 110, but the tool could also be a router, fastener installation tool, et. Thus, the drill 110 and tool support member 94 comprise a variable weight moveably mounted to the beam member 88 (a variable weight because different tools can be mounted thereto).

Referring particularly to FIGS. 3, 5 and 7 it can be seen that the end 38 of the frame member 34 incorporates a pin 112. The beam member 88 incorporates an angular groove 111 having a center of curvature corresponding to the longitudinal axis 40. A stop member 114 is slideably mounted therein. Thus, the support beam can rotate over 360 degrees in either direction before the pin 112 contacting the stop member 114 forces the stop member into contact with one of the ends of groove 111.

It is readily apparent that the static torque produced by the tool support member 94 and drill 110 about the longitudinal axis 40 can change due to changes in their radial and angular position about the axis of rotation. The static torque can also vary because of a change in the type of tool mounted. Thus, a static torque counterbalancing system 120 is provided. Referring to FIGS. 1, 5, 6 and 7 it can be seen that the system 120 consists of a pneumatic power actuator 122 pivotally attached at end 124 to the frame member 34. A piston 125 having a piston rod 126 attached thereto is moveably mounted within the actuator. Thus, the actuator 122 can be pivoted about its end 124 at an angle 127 about the axis of rotation 40 in a horizontal plane 128 located a discrete distance 129 from the axis of rotation 40. A rod 126 is mounted in the plane of the gear 84 perpendicular to the longitudinal axis 40. A pulley 138 is slideably and rotatably mounted to the rod 136. A flexible cable 141 is attached at one end 142 to the piston rod 126 and at its opposite end 143 to a fitting 144 pivotally mounted to the gear 84 (about pin 145), and therebetween engages the pulley 138. Thus, the cable remains aligned with the actuator rod and aligned with the plane of gear 84.

Referring, particularly, to FIG. 6 it can be seen that the actuator 122 is coupled to a source of air 150 via an electrically controlled regulator 152. A computer 154, is provided with a computer program and data to machine the fuselage section 12 which includes the weight and center of gravity of the particular tool. Thus, the computer provides axial position Z, angular position, $\theta$, and radial position, R, to a motor controller 156 which in turn provides signals to motors 55, 86 and 106, respectively. A signal proportional to the pressure level required in the actuator 122 is provided to a regulator control signal generator 157 which provides a control signal to the regulator 152. These signals also compensate for the position of the center of weight of the tool support member and the tool itself. Thus, a signal proportional to the pressure level required in the actuator 122 is sent to the regulator 152 via a signal generator 157. Therefore, the static torque about the longitudinal axis 40 is always counterbalanced by adjusting the pressure level in the actuator 122. The pressure will adjust the position of the piston rod 126 to pull on the cable and thus apply a torque to gear 84 counterbalancing the static torque. Since the pulley is rotatively mounted and is free to translate along the rod and the second end of the cable is pivotally attached to the gear 84 and the actuator itself is pivotally mounted to the frame member 34, little or no extraneous forces are introduced by the counterbalancing system.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

The invention is applicable to machine tools.

I claim:

1. In a machine including a frame member having a longitudinal axis, a beam member rotatably mounted to the frame member extending substantially perpendicularly outward in one direction from the axis of rotation thereof, the axis of rotation being substantially aligned with the longitudinal axis of the frame member, and a variable weight mounted to the beam member, a system to counterbalance the static torque produced by the weight about the axis of rotation of the beam member comprising:
   a support member rotatably mounted to the frame member and coupled to the beam member for simultaneous rotation about the axis of rotation, said support member extending substantially perpendicularly outward in the opposite direction from the axis of rotation;
   a pressurizable power actuator having a first end pivotally mounted to the frame member moveable in a horizontal plane and a second end having an output shaft for producing an output force proportional to the pressure level within the actuator;
   coupling means connecting said output shaft to said support member; and
   pressure level control means for maintaining said pressure level within said actuator at a value to produce a torque sufficient to counterbalance the torque produced by the weight.

2. The system as set forth in claim 1 wherein:
   the variable weight is translatably mounted to the beam member for movement thereon; and
   said pressure control means further includes means to vary said value of said pressure level within said cylinder so that the weight remains counterbalanced as it translates along the beam.

3. The system as set forth in claim 2 wherein the weight comprises:
   a bar slideably mounted to said beam member; and
   a tool mount mounted to said bar.

4. The system as set forth in claim 3 wherein said horizontal plane is displaced a discrete distance from the axis of rotation.

5. The system as set forth in claim 4 wherein said coupling means comprises:
   a rod having a pulley member slideably mounted thereto, said rod mounted to the frame member substantially in said horizontal plane at substantially right angles to the axis of rotation; and
   flexible cable means having a first end pivotally coupled to said support beam, a second end attached to said output shaft and a portion therebetween extending at least partially about said pulley.

6. The system as set forth in claim 5 where the machine further includes a stand and the frame member is moveably mounted thereto translatable along the longitudinal axis, the system further comprising:
   a drive nut means mounted to the stand;
   a drive screw having first and second ends, said drive screw rotatively mounted at its first end to the frame member in proximity to the beam member and at its second end to the opposite end of the frame member and engaging said drive nut means therebetween;
   screw drive means mounted to the frame member for rotating said drive screw for causing said frame member to translate along its longitudinal axis; and
   drive screw tension control means mounted to the frame member and coupled to said first end of said drive screw, said tension control means for adjusting the tension on the portion of said drive screw between said first end thereof and said drive nut means.

7. The system as set forth in claim 6 wherein said drive screw tension control means comprises:
   a bearing mounted on the first end of said drive screw;
   means to axially restrain said bearing on said drive screw; and
   nut means threadably mounted to the frame member for axially restraining said bearing therein, said nut means translatable along the longitudinal axis of said frame member as said nut means rotates;
   such that rotation of said nut menas in one direction increases the tension load on said portion of said drive screw and rotation in the opposite direction decreases the tension load on said portion of said drive screw.

* * * * *